United States Patent [19]
Vranas

[11] 3,956,919
[45] May 18, 1976

[54] HIGH TEMPERATURE STRAIN GAGE CALIBRATION FIXTURE

[75] Inventor: Thomas Vranas, Hampton, Va.

[73] Assignee: The United States of America as represented by the United States National Aeronautics and Space Administration Office of General Counsel-Code GP, Washington, D.C.

[22] Filed: Dec. 19, 1974

[21] Appl. No.: 534,266

[52] U.S. Cl. .................................. 73/1 B; 73/15.6
[51] Int. Cl.² ......................................... G01L 25/00
[58] Field of Search ............................. 73/1 B, 15.6

[56] References Cited
UNITED STATES PATENTS

| | | | |
|---|---|---|---|
| 2,252,464 | 8/1941 | Kearns et al. | 73/1 B UX |
| 2,357,643 | 9/1944 | Floyd | 73/1 B |
| 3,005,332 | 10/1961 | McClintock | 73/1 B |
| 3,369,390 | 2/1968 | Chu et al. | 73/15.6 |

FOREIGN PATENTS OR APPLICATIONS

| | | | |
|---|---|---|---|
| 214,863 | 6/1968 | U.S.S.R. | 73/1 B |

Primary Examiner—Donald O. Woodiel
Assistant Examiner—Frederick Shoon
Attorney, Agent, or Firm—William H. King; Howard J. Osborn; John R. Manning

[57] ABSTRACT

An apparatus and method for calibrating high temperature strain gases which serve for both dead weight and constant deflection measurements. A cantilever support arm allows the test unit to slide into a furnace while one end is subjected to bending strain either by hanging weights upon it or by deflecting it with a push rod. The dual nature of the fixture permits both tests to be run without change of the test specimen or removal from the furnace.

13 Claims, 2 Drawing Figures

HIGH TEMPERATURE STRAIN GAGE CALIBRATION FIXTURE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to strain gage testing and specifically to an apparatus for calibrating strain gages at high temperatures.

An established method of calibrating and evaluating strain gages is to mount the gage on a standard test specimen of material whose characteristics are well documented and to thereby check the gage readings against predicted results based on calculations of the known characteristics of the material. Most test fixtures limit the mode of test of the standard specimen to tension for dead load tests and to bending for constant deflection tests. The dead load test is one in which the standard specimen is stressed in tension by adding weights to a fixture which causes elongation. The predictable elongation of the standard specimen is then compared to the reading taken from the strain gage to establish a calibration curve for the gage. Under the typical system of tension calibration, however, the gage calibration cannot be directly compared to results attained with an identical gage tested in a bending mode.

It is also of considerable interest to calibrate strain gages in what is termed a constant deflection mode. This is particularly of interest in systems where the gages and test specimens are subjected to varying temperatures. In such calibration system the standard specimen is deflected a fixed amount in a bending mode, usually by an inclined plane wedge, and both the specimen and the strain gage are subjected to heat. The known characteristics of expansion and other thermal effects of the standard specimen can be appropriately discounted in calibrating the changes of strain gage readings with thermal changes.

Since conventional tension testing requires a different specimen than constant deflection testing, errors are caused by the difference in strain patterns which result from different standard specimen configurations. Moreover, the different standard specimen configuration requires twice as many standard specimens to be used and requires different test fixtures for each test.

It is therefore an object of the present invention to provide an improved test fixture capable of subjecting a single test specimen to both dead weight and constant deflection testing. Another object of the invention is to facilitate the thermal cycling of the test specimen and strain gage while subjecting the test specimen to alternate testing in the dead weight and constant deflection mode. Still another object of the invention is to provide a direct means of measuring the amount of deflection to which the specimen is subjected in the constant deflection mode.

SUMMARY OF THE INVENTION

These and other objects of the invention are achieved by the use of a test fixture which supports the test specimen from one end of a cantilever arm and operates on the other end of the test specimen to subject it to dead weight and constant deflection forces in the bending mode.

In a typical arrangement the cantilever support arm has a cut-out center portion so that the test specimen may be bolted to the outboard end of the arm and yet have considerable motion at the inboard end of the support arm with no mechanical interference throughout the length of the test specimen. The cut-out portion also allows the combination of the support arm and test specimen to display minimum cross section both in height and width and thus permits the combination to slide axially into a tubular furnace chamber of minimum size.

At the inboard end of the support arm, the arm is connected to a vertical front plate containing a hole which matches the support arm cut-out and permits a loading adapter bolted to the free end of the test specimen to protrude through the front plate. The loading adapter is the part upon which the actual test forces operate. A weight hanger is hung around the end of the loading adapter and hangs below the support structure for ease of addition or removal of weights for dead weight testing. The loading adapter is also subject to pressure from above by a push rod operated by a lead screw and vernier arrangement. This push rod thus can apply constant deflection in exactly the same direction as the dead weight test, eliminating any need for interpretation of calibration results due to different force actions during the two test modes.

The loading adapter length and thermal insulators placed on the front plate and within the length of the loading adapter supply thermal isolation between the furnace and the load force systems. This isolation permits the operating mechanisms to remain below 80°F. while the test specimen and attached gages are operating as high as 1600°F., thus allowing alternate application of each force mode to the specimen at each temperature under study with safety and convenience. A complete set of data can therefore be secured during a single cycling of the furnace. Because the cycling time of a high temperature furnace is so great, the present invention thereby yields dramatic savings in testing time.

DETAILED DESCRIPTION OF THE INVENTION

Structure of the Preferred Embodiment

Figure 1:
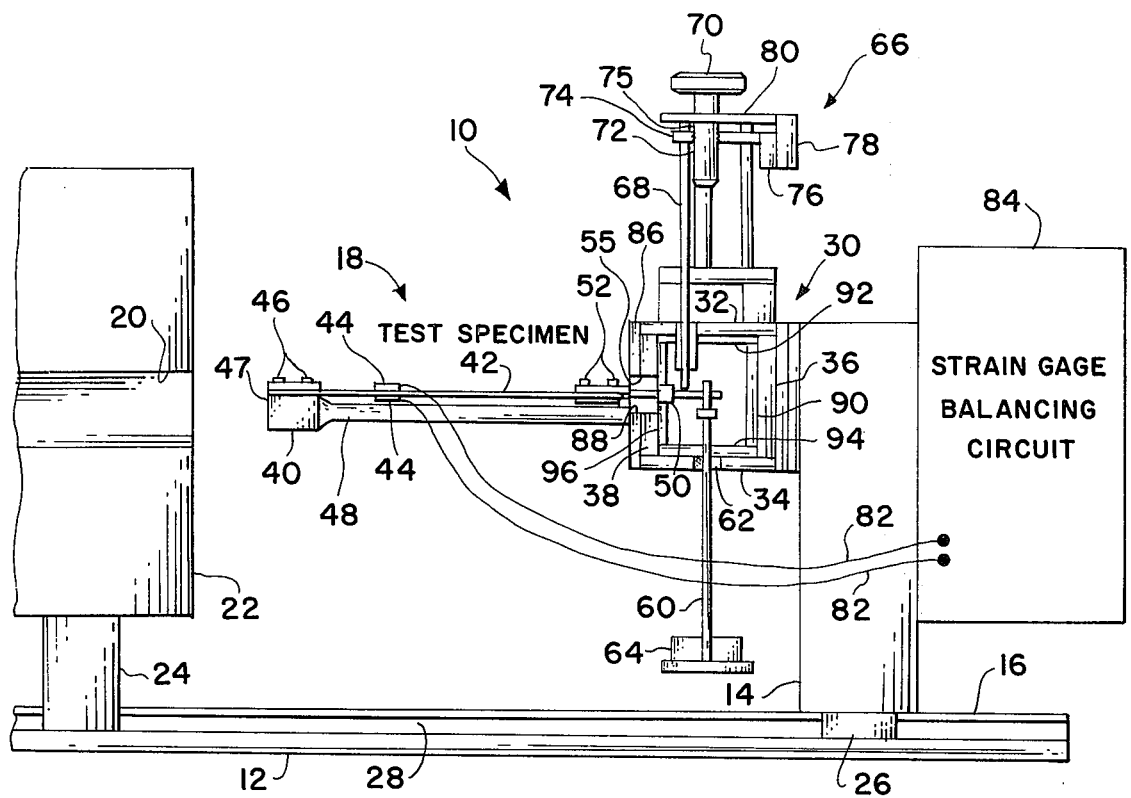
FIG. 1 is a partial cross-sectional view of the arrangement of parts in a preferred embodiment of the invention.

The preferred embodiment selected for illustration is shown in FIG. 1. Test fixture 10 is held in place upon base 12 by upright support 14 which is connected to base 12 by slidable joint 16 which extends the entire length of base 12. Slidable joint 16 permits the cantilever portion 18 of fixture 10 to be inserted into tubular area 20 of the furnace 22 by simply pushing test fixture 10 along the base 12 to which furnace 22 is rigidly attached by vertical support 24. Heat for furnace 22 is furnished by any conventional means. Support 14 is held in proper alinement with tubular area 20 by attached block 26 which rides within groove 28 in base 12.

Support box 30, attached to upright support 14, is an open-sided structure assembled from top plate 32, bottom plate 34, back plate 36, and front plate 38. Cantilever support arm 40, which is attached to front plate 38 extends outward a distance somewhat greater than the length of test specimen 42 to which are bonded gages 44 to be evaluated. Test specimen 42 is attached to support arm 40 by bolts 46 at the outboard end 47 and is held completely clear of side 48 of support arm 40. The center portion of support arm 40 is cut out to a sufficient width to permit test specimen 42 to flex downward without interference. Loading adapter 50 (FIG. 2) bolted to test specimen 42, by bolts 52 extends through hole 55 in front plate 38 to the center of support box 30.

Figure 2:
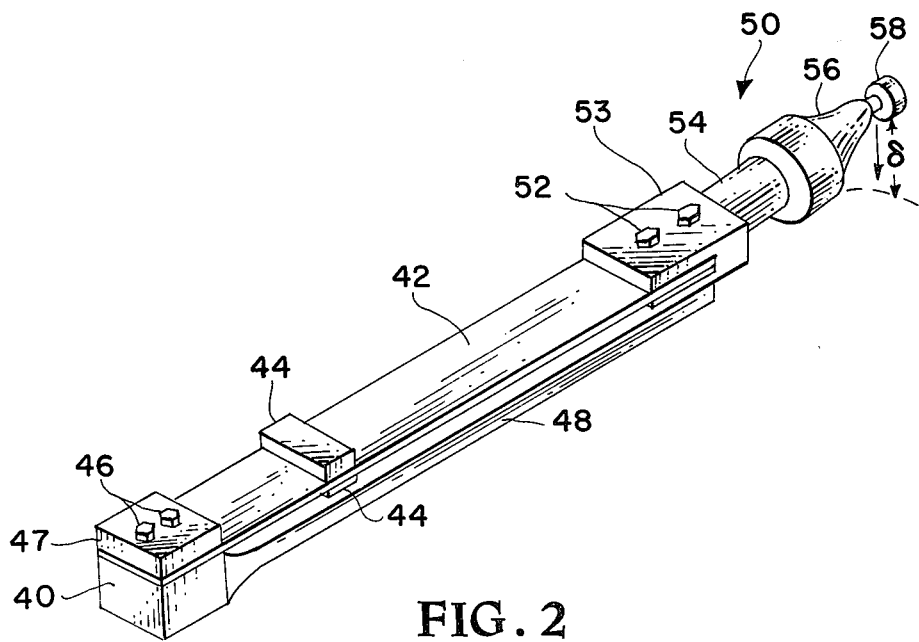
FIG. 2 is a perspective view of the test specimen and cantilever support arm portion of the invention.

As shown in FIG. 2, loading adapter 50 is constructed by bonding porcelain thermal insulator 54 between adapter section 53 and loading rod 56 which is a rod structure with locating groove 58 cut into it to permit weight hanger 60 to hang loosely upon loading adapter 50 without sliding off. The thermal insulation and the length of insulation 54 furnish sufficient isolation between the furnace heat and support box 30 to prevent damage due to excess heat transfer to the load applying mechanism and to permit safe operation. Weight hanger 60 hangs downward from loading adapter 50 through hole 62 in bottom plate 34 to permit ease of replacement of weight 64 for operation in the dead weight mode of testing.

Deflection assembly 66 functions for the constant deflection mode of operation to drive push rod 68 against loading adapter 50 and thus deflect test specimen 42 by a prescribed amount. Deflection assembly operates as a conventional threaded drive wherein turning knob 70 causes threaded rod 72 to move deflection plate 74 with a mated threaded hole 75 and attached push rod 68 in a direction parallel to the axis of threaded rod 72. Vernier scale 76 attached to deflection plate 74 and scale 78 attached to fixed plate 80 act together as a vernier measurement system to provide accurate indications of the amount of deflection to which the test specimen is subjected.

During calibration of strain gage 44 and subsequent use of the apparatus to test various material specimens, gage 44 is attached by leads 82 to strain gage balancing circuit 84. Balancing circuit 84 is attached to the back side of support 14 and moves along with test fixture 10 so that no disconnection of electrical circuits is required at any time during the test procedure.

To furnish protection for the loading mechanisms, balancing circuit, and the test operator from the heat of the furnace, various thermal insulators are attached to the assembly. Front insulator 86 is attached to front plate 38 on the side facing furnace 22. When cantilever support arm 40 is placed into furnace 22, insulator 86 is pushed tightly against furnace 22 to form the basic heat closure. Hole 88 in the center of insulator 86 is made just large enough to give proper clearance for the movements of loading adapter 50. Thermal insulators 90, 92, 94, and 96 are attached, respectively, to inner surfaces of back plate 36, top plate 32, bottom plate 34, and front plate 38 to further protect the loading mechanisms from the furnace heat.

OPERATION OF THE PREFERRED EMBODIMENT

Before mounting test specimen 42, loading adapter 50 is attached by bolts 52 to the end farthest removed from the part to which gages 44 have been bonded. Turning knob 70 is then backed off to move push rod 68 as far back as possible and test specimen 42 is attached to cantilever support arm 40 at outboard end 47 by use of bolts 46. Lead wires 82 are then connected between strain gages 44 and balancing circuit 84. Test fixture 10 is then pushed into the test position with cantilever support arm 40 and test specimen 42 within furnace 22, and insulator 86 tightly against furnace 22. Furnace 22 is then raised to each temperature of interest and three tests are run at each temperature setting.

A no/load, no/deflection test is run to test for changes in gage characteristics due to temperature alone. For this test, weight hanger 60 is removed and push rod 68 is backed off. Balancing circuit 84 is then read to establish the output of gages 44 and further tests on electrical resistance to the test fixture are also performed.

For the dead weight test, weight hanger 60 is installed upon loading adapter 50 and various predetermined weights are substituted for weight 64. Balancing circuit 84 is read for each different weight applied.

For the constant deflection test it is first necessary to establish a "zero" reference point at approximately 5% of total expected deflection. Vernier scale 76 is read at this point and this reading is assumed to be the zero reading. Test points are then established at various measures of deflection which are of interest and the balancing circuit is read at each point. Repetition of the same readings on the vernier scale when the test specimen is at different temperatures will repeat the same deflection of the test specimen.

Each of these three tests, the no/load test, the dead weight test and the constant deflection test is performed separately at each temperature setting of the furnace. The long time required to reach a stable temperature in the typical furnace makes the ability to accurately repeat each test at each temperature a distinct advantage in that only one progressive run through the temperature points need be made rather than three.

It is to be understood that the forms of the invention herein shown are merely preferred embodiments. Various changes may be made in the shape, size, or arrangement of parts; equivalent means may be substituted for those illustrated and described and certain features may be used independently from other features without departing from the spirit and scope of the invention. For example, other deflection measurement means such as an electrical slidewire or potentiometer may be used or other heat sealing means may be used instead of insulator 86 attached to front plate 38.

What is claimed as new and desired to be secured by Letters Patent of the United States is:

1. An apparatus for calibrating high temperature strain gages in the bending mode comprising:
   furnace means containing a heating area;
   support means capable of placement within the heating area of said furnace;
   test specimen means attached to said support means;
   strain gages to be evaluated, attached to said test specimen means;
   loading adapter means attached to said test specimen means;
   dead weight loading means to apply force to said loading adapter means;
   constant deflection loading means to deflect said loading adapter means a fixed amount independent of said dead weight loading means;

deflection measuring means; and strain gage reading means for calibrating said strain gages.

2. An apparatus for calibrating high temperature strain gages in the bending mode as in claim 1 wherein an alinement means is included which facilitates the placement of said support means into the heating area of said furnace means.

3. An apparatus for calibrating high temperature strain gages in the bending mode as in claim 2 wherein said alinement means is comprised of:
   base means capable of maintaining alinement between two attached structures while the structures are moved toward each other;
   first structure means attaching said furnace means to said base means and being one of the two structures maintained in alinement by said base means;
   second structure means, moveably attached to said base means and maintained in alinement with said furnace means, to which said support means is attached thereby maintaining alinement between said furnace means and said support means.

4. An apparatus for calibrating high temperature strain gages as in claim 3 wherein said support means is attached to said second structure means by a box structure means comprising a front plate with hole suitable for said loading adapter means to protrude through; a top plate capable of supporting said constant deflection loading means; a back plate attached to said second structure means; and a bottom plate with hole suitable dead weight loading means to protrude through for attachment to loading adapter means.

5. An apparatus for calibrating high temperature strain gages as in claim 4 which includes a thermal insulator plate on the furnace side of said front plate which acts as a heat seal for the furnace when pushed against the furnace opening when the support means is placed within the furnace.

6. An apparatus for calibrating high temperature strain gages as in claim 4 which includes thermal insulating plates on the inside box surfaces formed by said front, upper, back and bottom plates.

7. An apparatus for calibrating high temperature strain gages in the bending mode as in claim 1 wherein the heating area within said furnace is tubular, said support means is of a configuration whereby its placement within the tubular heating area is parallel to the axis of the tubular area, said test specimen is attached to the end of said support means nearest said furnace means, and said loading adapter is attached to said test specimen at the end most remote from said furnace means.

8. An apparatus for calibrating high temperature strain gages in the bending mode as in claim 1 wherein said dead weight loading means is a weight hanger means removeably attached to said loading adapter means and capable of subjecting said loading adapter means to forces dependent on interchangeable weight means attached to said weight hanger means.

9. An apparatus for calibrating high temperature strain gages in the bending mode as in claim 1 wherein said constant deflection loading means comprises push rod means attached to said support means which is capable of pushing against said loading adapter means and subjecting said loading adapter means to forces similar to but independent of those produced by said weight hanger means and said deflection measuring means comprises push rod movement measurement means which accurately measures the amount of motion of said push rod and thereby measures the motion of said loading adapter.

10. An apparatus for calibrating high temperature strain gages as in claim 9 wherein said push rod means is driven by a threaded mechanism comprising a turning knob attached to a threaded rod which transports a deflection plate with matching threaded hole in a direction parallel to the axis of the threaded rod and to which said push rod means is rigidly attached.

11. An apparatus for calibrating high temperature strain gages as in claim 10 wherein said push rod movement measuring means is a vernier measuring system comprising one scale attached to said moving deflection plate and second scale attached to a fixed plate.

12. An apparatus for calibrating high temperature strain gages as in claim 1 wherein said loading adapter means forms an extension of said test specimen means and is comprised of an adapter section attached to said test specimen; a thermal insulator section attached to the end of the adapter section most remote from said test specimen; and a loading rod means attached to the other end of said thermal insulator section.

13. A method of calibrating high temperature strain gages comprising the steps of:
   providing strain gages to be calibrated;
   providing a test specimen of known strain characteristics;
   providing a fixture for subjecting said test specimen to dead weight and constant deflection loading;
   providing a heating device for heating said test specimen to various temperature levels;
   providing a balancing circuit for reading the output of said strain gages;
   affixing said strain gages to said test specimen;
   connecting said strain gages to said balancing circuit;
   measuring the output of said strain gages at room temperature under no load, dead weight load and constant deflection load conditions;
   heating said test specimen to a selected temperature of interest;
   measuring the output of said strain gages at said selected temperature of interest under no load, dead weight load and constant deflection load conditions;
   repeating said heating and measuring cycles for each successive temperature of interest;
   comparing the output signal of said strain gages with the known strain characteristics of said test specimen.

* * * * *